(12) United States Patent
Oikawa

(10) Patent No.: US 8,078,049 B2
(45) Date of Patent: Dec. 13, 2011

(54) IMAGING APPARATUS

(75) Inventor: Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/495,813

(22) Filed: Jul. 1, 2009

(65) Prior Publication Data

US 2010/0003025 A1    Jan. 7, 2010

(30) Foreign Application Priority Data

Jul. 3, 2008    (JP) ................. 2008-174558

(51) Int. Cl.
*G03B 13/02*    (2006.01)

(52) U.S. Cl. ........................................ 396/374

(58) Field of Classification Search .......... 396/373, 396/374, 384
See application file for complete search history.

(56) References Cited

U.S. PATENT DOCUMENTS

| | | | | |
|---|---|---|---|---|
| 5,557,358 A | * | 9/1996 | Mukai et al. | 396/296 |
| 6,650,837 B1 | * | 11/2003 | Richiuso | 396/373 |
| 2006/0044527 A1 | * | 3/2006 | Watanabe et al. | 353/97 |
| 2008/0158259 A1 | * | 7/2008 | Kempf et al. | 345/647 |

FOREIGN PATENT DOCUMENTS

| | | | |
|---|---|---|---|
| JP | 6-282004 A | | 10/1994 |
| JP | 9046559 A | * | 2/1997 |
| JP | 2008244511 A | * | 10/2008 |

* cited by examiner

*Primary Examiner* — Clayton E Laballe
*Assistant Examiner* — Noam Reisner

(57) ABSTRACT

An imaging apparatus includes an image sensor configured to capture an image of a subject, a finder optical system configured to enable a photographer to optically observe the subject, and an image display unit disposed in the finder optical system and configured to display an image of the subject captured by the image sensor and to enable the photographer to observe an electronic image of the subject when the photographer looks in the finder optical system. The image display unit is configured to display an image having been subjected to image processing performed on the electronic image considering a distortion caused by the finder optical system.

7 Claims, 12 Drawing Sheets

IMAGING APPARATUS

BACKGROUND OF THE INVENTION

1. Field of the Invention

The present invention relates to an imaging apparatus that can capture an electronic image.

2. Description of the Related Art

As discussed in Japanese Patent Application Laid-Open No. 06-282004, there is a conventional camera that enables a photographer to know a rate of an image-capturing screen occupied by an area having calculated adequate exposure value and approximately adequate exposure value when the photographer looks in a finder.

The above-described camera is configured to display an object image on a focusing screen of the finder and also display exposure conditions (e.g., subject luminance distribution, shutter speed, and diaphragm state) of the camera on separate display units positioned near the finder. The camera can divide the object image into a plurality of segments in a two-dimensional matrix pattern and measure the luminance in each segment. A central processing unit (i.e., CPU) provided in the camera can process the measured luminance data.

A histogram, which can be displayed by the display unit of the camera, includes a central portion indicating the number of segments whose luminance is optimum for the designed exposure conditions, a right side indicating the number of segments having higher luminance values, and a left side indicating the number of segments having lower luminance values.

According to the camera discussed in Japanese Patent Application Laid-Open No. 06-282004, photographers cannot confirm various conditions that may be required to capture intended photographs even though the photographers can know the rate of the image-capturing screen occupied by the area having calculated adequate exposure value and the approximately adequate exposure values when the photographers look in the finder.

For example, photographers cannot confirm whether an appropriate white balance is set, whether a shutter speed is adequate to prevent a blur of an image, whether a subject is in focus, and whether a composition resulting from an image stabilization operation is an intended one.

Moreover, photographers cannot confirm the presence of a foreign particle adhered to an optical low-pass filter and a mode setting state that can be switched between a color mode and a monochrome mode. From the foregoing reasons, the camera is desired to let photographers confirm a previously captured image in a shooting operation.

SUMMARY OF THE INVENTION

The present invention is directed to an imaging apparatus that enables users to confirm the state of a captured image, camera settings, and photographic auxiliary information without missing photo opportunities.

According to an aspect of the present invention, an imaging apparatus includes an image sensor configured to capture an image of a subject, a finder optical system configured to enable a photographer to optically observe the subject, and an image display unit disposed in the finder optical system and configured to display an image of the subject captured by the image sensor and to enable the photographer to observe an electronic image of the subject when the photographer looks in the finder optical system. The image display unit is configured to display an image having been subjected to image processing performed on the electronic image considering a distortion caused by the finder optical system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

An imaging apparatus according to an exemplary embodiment can be applied to a digital single lens reflex camera. The digital single lens reflex camera according to the present exemplary embodiment is a still camera that can capture an object image (i.e., a subject image) with an image sensor, such as a complementary metal oxide semiconductor (i.e., CMOS) or a charge coupled device (i.e., CCD). The digital single lens reflex camera includes a release button provided on an outer casing of the camera, which enables users to instruct execution of an image capturing operation.

The camera includes, as a shooting mode, a continuous shooting mode according to which the camera repetitively performs the image capturing operation if the release button is continuously pressed. The camera causes a subject image observation movable mirror to retreat from an imaging optical path while a user is operating the release button in a state where the continuous shooting mode is selected. In the image capturing operation repetitively performed by the camera, the object image (i.e., the subject image) can be photoelectrically converted into an electronic image.

Figure 1:
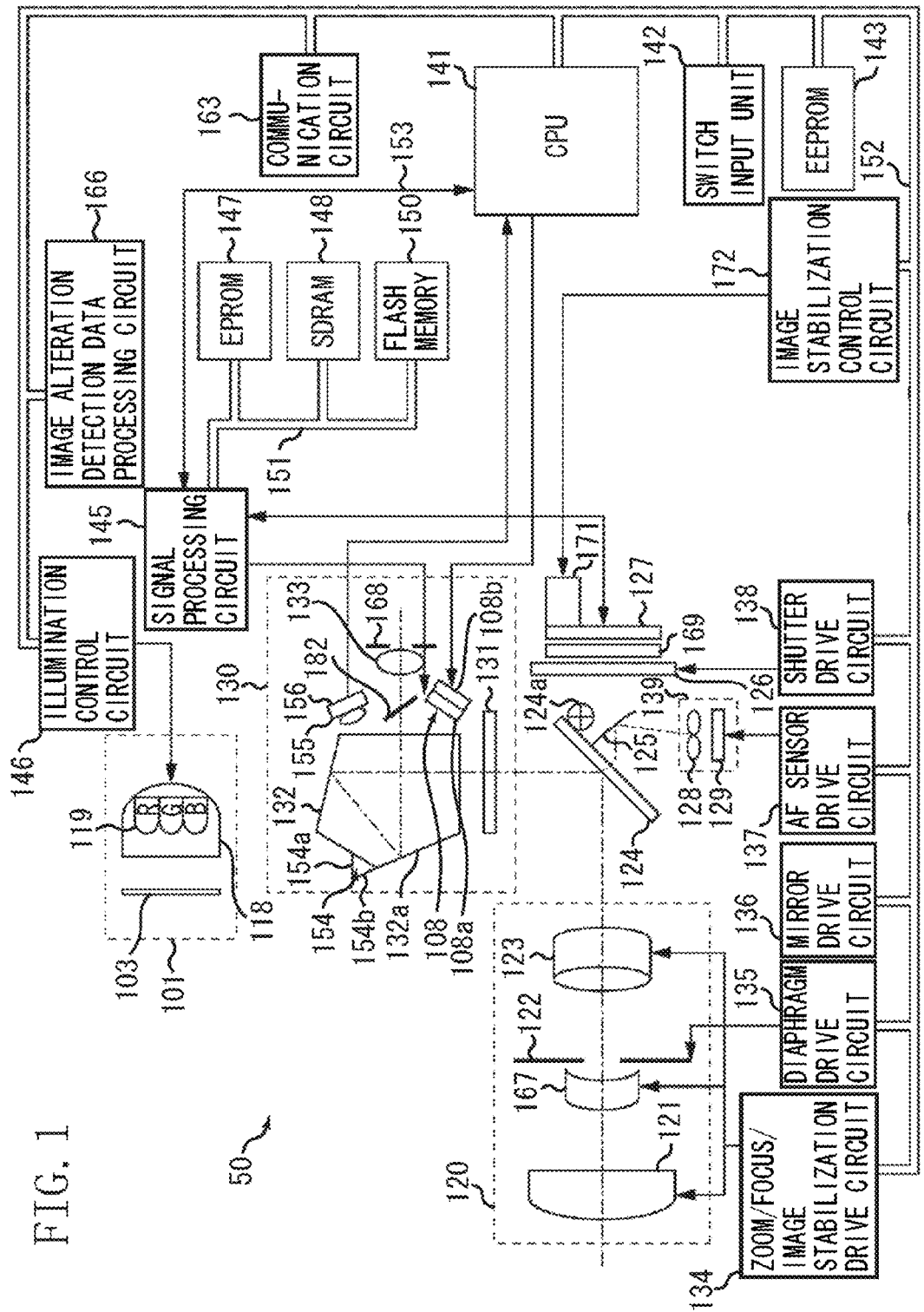
FIG. 1 illustrates a configuration of an electric circuit of a digital single lens reflex camera according to an exemplary embodiment of the present invention.

FIG. 1 illustrates an example configuration of an electric circuit of a digital single lens reflex camera according to a first exemplary embodiment.

A digital single lens reflex camera 50 includes a CPU 141 that can control various operation sequences of the camera, an illumination unit 101, a photographic lens 120, a movable mirror 124, a shutter 126, and an image sensor 127. The image sensor 127 includes a rectangular image capturing unit that has an aspect ratio of 3:2.

The digital single lens reflex camera 50 further includes a finder apparatus 130, a focus detection apparatus 139, a zoom/focus/image stabilization drive circuit 134, a diaphragm drive circuit 135, a mirror drive circuit 136, and an AF sensor drive circuit 137. The digital single lens reflex camera 50 further includes a shutter drive circuit 138, an image stabilization control circuit 172, an image alteration detection data processing circuit 166, and a communication circuit 163.

The image stabilization control circuit 172 can adjust the position of the image sensor 127 to prevent the shake of an image. The communication circuit 163 includes a circuit dedicated to, for example, wireless communications or infrared communications. If the communication circuit 163 is dedicated to the infrared communications, the communication circuit 163 can communicate with a portable phone using a relatively small amount of data.

The digital single lens reflex camera 50 further includes a switch input unit 142, an electrically erasable and programmable read only memory (i.e., EEPROM) 143, a signal processing circuit 145, an illumination control circuit 146, an erasable programmable read only memory (i.e., EPROM) 147, a synchronous dynamic random access memory (SDRAM) 148, and a flash memory 150.

The photographic lens 120 includes a plurality of lens groups 121, 167, and 123 and a diaphragm mechanism 122 provided between the lens groups 167 and 123. The zoom/focus/image stabilization drive circuit 134 can drive the lens groups (i.e., the lens groups 121, 167, and 123). The diaphragm drive circuit 135 can drive the diaphragm mechanism (hereinafter, simply referred to as "diaphragm") 122.

The movable mirror 124 is positioned behind the lens groups (i.e., the lens groups 121, 167, and 123). The movable mirror 124 includes a half mirror and its holding mechanism. The movable mirror 124 is movable between a mirror-down position (which can be referred to as a first position) and a mirror-up position (which can be referred to as a second position).

In an exposure operation (i.e., an image capturing operation), the movable mirror 124 can rotate around a stationary axis 124a and move upward from the first position toward a focusing screen 131 and reach the second position (i.e., the mirror-up position). As a result, the movable mirror 124 can retreat from the imaging optical path. A sub mirror 125 is a concave mirror, which is provided on a back surface of the movable mirror 124 at the center thereof. The sub mirror 125 can reflect object light downward as understood from the drawing.

An image re-forming optical system 128, provided at a lower part of a reflection optical axis of the sub mirror 125, can perform image separation with two lenses. An AF sensor 129 is provided at an image-forming position of a subject image formed by the image re-forming optical system 128. The AF sensor 129 is connected to the AF sensor drive circuit 137.

The sub mirror 125, the image re-forming optical system 128, and the AF sensor 129 cooperatively configure the focus detection apparatus 139. The focus detection apparatus 139 can detect an image-forming state of a subject on a plurality of positions on the image sensor 127 according to a conventional phase difference detection method.

The zoom/focus/image stabilization drive circuit 134 includes a driving source (e.g., an electromagnetic motor or an ultrasonic motor), a driver circuit that can control the driving source, and an encoder apparatus that can detect the position of the lens.

The zoom/focus/image stabilization drive circuit 134 can perform zoom control and focus control for adjusting the position of the lens groups (i.e., the lens groups 121, 167, and 123) in the optical axis direction. The zoom/focus/image stabilization drive circuit 134 can further perform image stabilization control for moving the position of the lens 167 in a direction perpendicular o the optical axis.

A finder optical system is provided on a reflection optical path of the movable mirror 124. The finder optical system includes the focusing screen 131, a pentagonal prism 132 made from optical glass, and an eyepiece lens 133. The finder apparatus 130 includes a liquid crystal display device 108, a prism 154, a light metering lens 155, and a light metering sensor 156, in addition to the finder optical system.

The movable mirror 124 reflects the object light (i.e., incident light) having transmitted through the lens groups (i.e., the lens groups 121, 167, and 123) of the photographic lens 120. An image of the reflected light is formed on the focusing screen 131. An observer can visually recognize the optical object image (i.e., the optical image) formed on the focusing screen 131 from a single eyepiece window 168 via the pentagonal prism 132 and the eyepiece lens 133. In this case, the observer can observe the optical image without substantial time delay.

The light metering sensor 156 is capable of performing light measurement. Namely, the light metering sensor 156 detects a brightness of the object image on the focusing screen 131 via the light metering lens 155. The light metering sensor 156 and the light metering lens 155 are positioned on a light measuring axis, which is offset from an observation optical axis of the eyepiece lens 133, in the finder apparatus 130.

The light metering sensor 156 is constituted by a plurality of photodiodes that constitute divided light-receiving surfaces. The photodiodes of the light metering sensor 156 respectively generate luminance outputs. The CPU 141 performs calculations according to a distance measuring position on the focusing screen 131 that can be controlled by the focus detection apparatus 139. The CPU 141 obtains subject luminance information (i.e., BV value) to perform exposure control based on the calculation result.

The shutter 126, a filter 169 (e.g., an optical low-pass filter or an infrared cut filter), and the image sensor 127 (e.g., a CCD imager or a CMOS imager) are positioned behind the movable mirror 124. The camera 50 further includes a dustproof mechanism (not illustrated) that can mechanically vibrate the filter 169 to accelerate and remove foreign particles from the filter surface.

The shutter drive circuit 138 can drive the shutter 126 to open for a predetermined time corresponding to a shutter speed. When the shutter 126 is in an opened state, the object image can be guided to the light-receiving surfaces of the image sensor 127. The movable mirror 124, when it is driven by the mirror drive circuit 136, can retreat from the optical axis of the photographic lens 120 upward and reach the second position, while the shutter 126 is driven by the shutter drive circuit 138 and set in an open state.

Therefore, the object image can be guided to the light-receiving surfaces of the image sensor 127. The camera performs an image capturing operation. In this state, an image stabilization mechanism 171, which is connected to the image stabilization control circuit 172, can shift and rotate the image sensor 127 in a predetermined direction to cancel the blur of an image. Thus, the image stabilization mechanism 171 can prevent the image from shifting undesirably and lowering the resolution.

The image stabilization mechanism 171 is adjacent to the image sensor 127 and far from a division point of the optical path that extends to the finder apparatus 130. Therefore, a photographer cannot check the change of the composition due to the shift or the rotation of the image sensor 127 via the finder apparatus 130.

The CPU 141 is connected, via a data bus 152, to the zoom/focus/image stabilization drive circuit 134, the diaphragm drive circuit 135, the mirror drive circuit 136, and the AF sensor drive circuit 137. The CPU 141 is further connected, via the data bus 152, to the shutter drive circuit 138, the image stabilization control circuit 172, and the communication circuit 163.

The CPU 141 is further connected, via the data bus 152, to the image alteration detection data processing circuit 166 and the illumination control circuit 146. The CPU 141 is further connected, via the data bus 152, to the switch input unit 142 and the EEPROM 143 (nonvolatile memory).

The switch input unit 142 includes a first release switch and a second release switch. The first release switch is turned on when the release button (not illustrated) provided on the outer casing of the camera is half pressed. The second release switch is turned on when the release button is fully pressed.

The switch input unit 142 further includes a switch operable in conjunction with a power switch of the camera and a plurality of switches (e.g., mode switches) operable by various mode buttons of the camera. The switch input unit 142 can supply an operation signal to the CPU 141 based on each switch operation.

The EEPROM 143 is a nonvolatile semiconductor memory. The EEPROM 143 may store adjustment values for each camera that are required in production processes to eliminate differences between individual cameras to be delivered. The EEPROM 143 may store coefficient data that can define a relationship between the BV value and the light quantity of the backlight, referring to which the CPU 141 can determine the light quantity of the backlight 108b based on an output of the light metering sensor 156.

The CPU 141 controls the AF sensor drive circuit 137 in response to a turning-on state of the first release switch and calculates a distance between two images on the AF sensor 129. The CPU 141 controls the zoom/focus/image stabilization drive circuit 134 based on the calculated distance data and performs focus adjustment for the photographic lens 120.

The CPU 141 controls the mirror drive circuit 136 in response to a turning-on state of the second release switch, to cause the movable mirror 124 to retreat from the optical axis to the second position. In addition to the above-described retreat control, the CPU 141 obtains an adequate diaphragm value, a shutter time, and an image sensor sensitivity based on the subject luminance information that can be obtained based on an output of the light metering sensor 156.

The CPU 141 causes the diaphragm drive circuit 135 to drive the diaphragm mechanism 122 based on the obtained diaphragm value. The CPU 141 causes the shutter drive circuit 138 to drive the shutter 126 based on the obtained shutter speed. The CPU 141 further determines a current amount to be supplied to the backlight 108b referring to the coefficient data stored in the EEPROM 143 that define the relationship between the BV value and the light quantity of the backlight. Then, the CPU 141 obtains an appropriate quantity of light that is required to visually recognize an image.

In a state where the shutter 126 is opened, a subject image is formed on the light-receiving surfaces of the image sensor 127. The object image is converted into an analog image signal and is then converted into a digital image signal by the signal processing circuit 145.

The signal processing circuit 145 includes a reduced instruction set computer (RISC) processor, a color processor, and a Joint Photographic Experts Group (JPEG) processor. The signal processing circuit 145 performs image processing (e.g., compression/expansion processing, white balance processing, and edge enhancement processing) on a digital image signal. The signal processing circuit 145 further performs conversion processing for a composite signal (e.g., a luminance signal, a color-difference signal, etc.) to be output to the liquid crystal display device 108.

The CPU 141 and the signal processing circuit 145 are connected to each other via a communication line 153, to perform transmission/reception of a control signal (e.g., an image signal input timing signal) and data via the communication line 153.

The composite signal generated by the signal processing circuit 145 is output to the liquid crystal display device 108 of the finder apparatus 130. The liquid crystal display device 108 displays an electronic subject image. The liquid crystal display device 108 is positioned between the pentagonal prism 132 and the eyepiece lens 133.

The liquid crystal display device 108 includes a liquid crystal display (LCD) element 108a and the backlight 108b. The (LCD) element 108a is a display element that can display a color image. The backlight 108b illuminates a display surface of the LCD 108a from the rear side. The backlight 108b may be constituted by a white light-emitting diode (LED).

Figure 3:
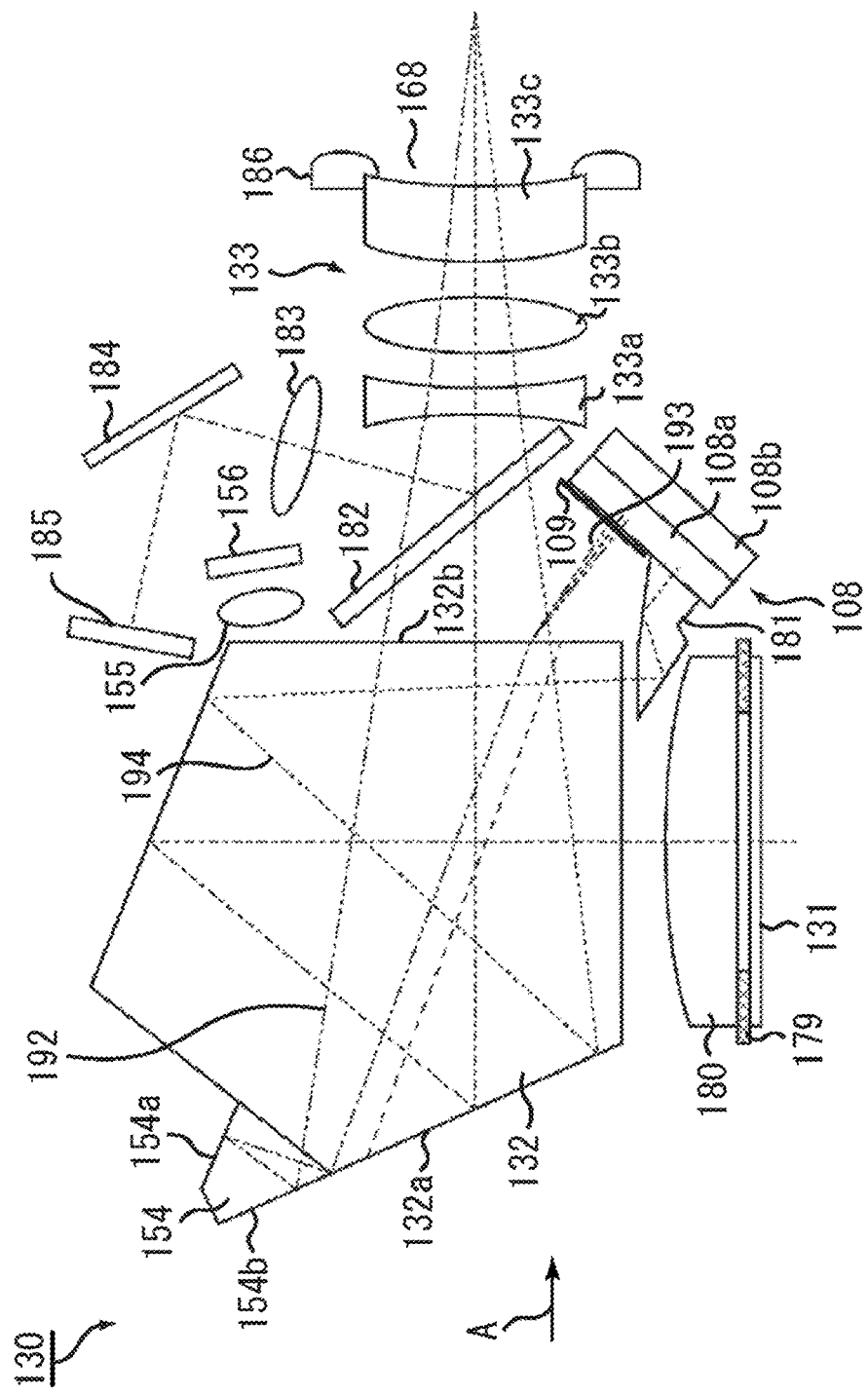
FIG. 3 is a cross-sectional view illustrating a configuration of a finder apparatus.

The pentagonal prism 132 includes a surface 154b that forms a flat surface continuously extending from a third reflection surface 132a (see FIG. 3). The pentagonal prism 132 and the prism 154 have the same refractive index and are bonded together with an adhesive selected according to the index matching.

The light beam (i.e., light flux) emitted from the liquid crystal display device 108 reflects twice on the inner surfaces of the prism 154 and can reach the eyepiece lens 133. In this case, a surface 154a has an appropriate curvature so that the display surface of the LCD 108a of the liquid crystal display device 108 can be optically equivalent to the position of the focusing screen 131.

An image displayed on the LCD 108a can be observed through the eyepiece window 168 even when the movable mirror 124 is positioned at the first position or the second position. The brightness of the image to be displayed on the LCD 108*a* can be adjusted to an appropriate value by controlling the amount of current supplied to a white LED (i.e., the backlight 108*b*).

The signal processing circuit 145 is connected to the EPROM 147, the SDRAM 148, and the flash memory 150 via the data bus 151.

The EPROM 147 stores a program that can be executed by the processor (i.e., CPU) provided in the signal processing circuit 145. The SDRAM 148 is a volatile memory that can temporarily store image data that may be subjected to the image processing and image data that are currently subjected to the image processing.

The flash memory 150 is a nonvolatile memory that can store finalized image data. The SDRAM 148 has the capability of performing a high-speed operation although its storage content disappears when the electric power supply is stopped. On the other hand, the flash memory 150 performs a low-speed operation and can hold its storage content even when a power source of the camera is turned off.

The illumination unit 101 includes a light-emitting panel 103, a reflector 118, and three high brightness LED 119 of RGB colors. The emitted light can pass directly, or via the reflector 118, through the light-emitting panel 103 and can reach a subject. The illumination unit 101 includes a built-in battery (not illustrated) that can activate the communication circuit even in a state where the illumination unit 101 is taken out of the camera body.

More specifically, the illumination unit 101 is configured to communicate with the camera body (i.e., the camera 50) via the communication circuit 163 according to, for example, the UWB standard, so that the illumination unit 101 can be remote controlled by the camera body. The illumination control circuit 146 determines a light quantity balance of respective RGB colors under the control of the CPU 141 and controls a light-emission instruction that may be supplied to the high brightness LED 119.

Figure 2:
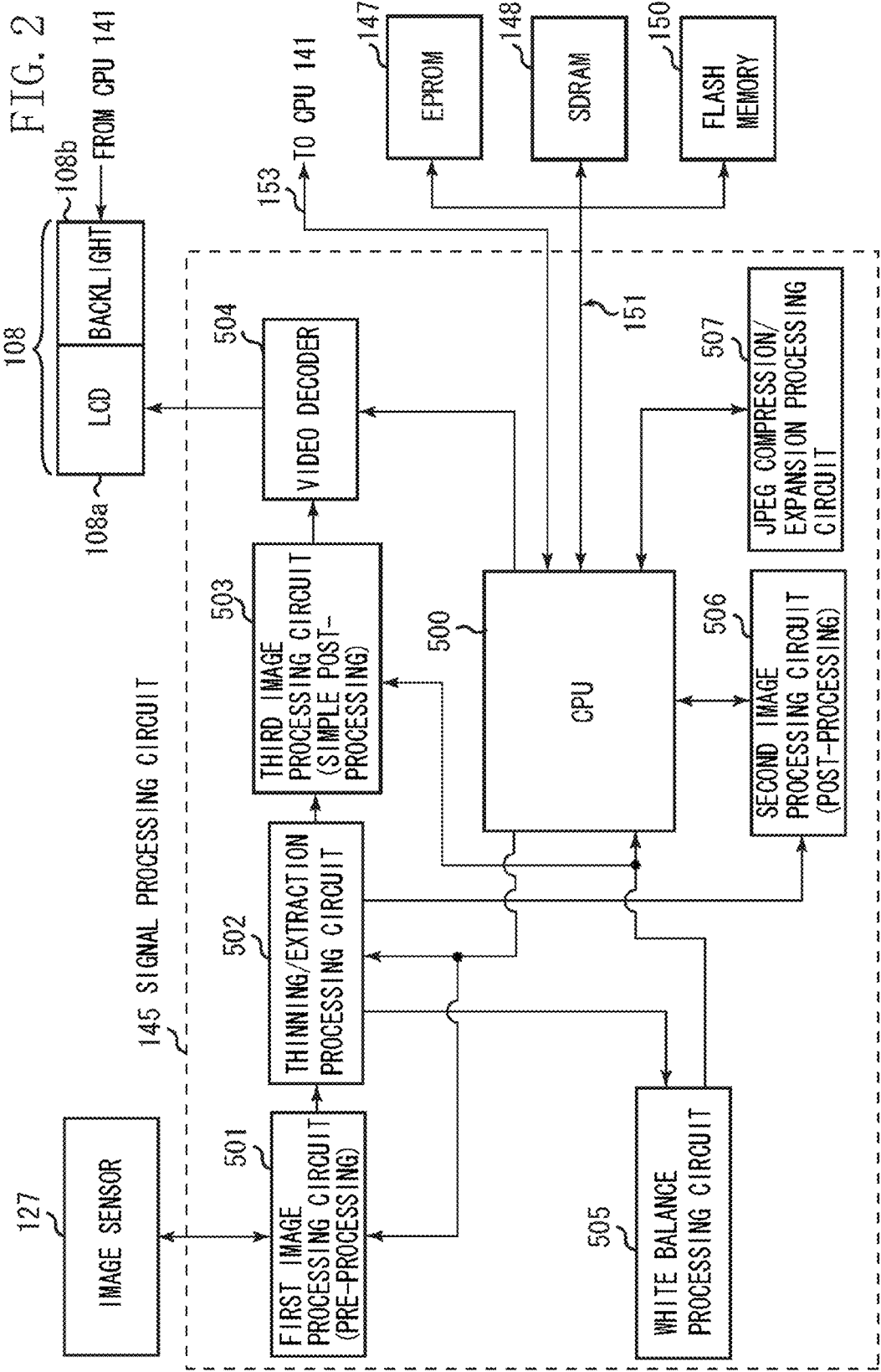
FIG. 2 is a block diagram illustrating an example electric circuit usable as a signal processing circuit and a peripheral circuit connected to the circuit.

FIG. 2 is a block diagram illustrating an example electric circuit usable as the signal processing circuit 145 and a peripheral circuit connected to the circuit. The signal processing circuit 145 includes a CPU 500 and a plurality of circuits that can operate according to a control signal supplied from the CPU 500. The CPU 500 can serve as a display control circuit capable of controlling a signal processing operation and an image processing control circuit.

The CPU 500 is connected to the CPU 141 (i.e., the central processing unit dedicated to a camera sequence control) via the communication line 153. The CPU 500 can control each circuit in the signal processing circuit 145 according to a control signal supplied from the CPU 141.

More specifically, the signal processing circuit 145 includes a first image processing circuit 501, a thinning/extraction processing circuit 502, a second image processing circuit 506, and a third image processing circuit 503.

The signal processing circuit 145 further includes a video decoder 504, a white balance processing circuit 505, and a JPEG compression/expansion processing circuit 507.

The first image processing circuit 501 is a pre-processing circuit configured to drive the image sensor 127 according to drive conditions that can be set by the CPU 500 and perform A/D conversion for generating a digital image signal from an analog image signal entered from the image sensor 127. The first image processing circuit 501 can further correct the digital image signal based on a pixel signal obtained from a light-shielding portion of the image sensor 127.

The thinning/extraction processing circuit 502 can perform thinning processing on the digital image signal, which is generated from the first image processing circuit 501. The thinning/extraction processing circuit 502 can output a processed signal to the second image processing circuit 506 and the third image processing circuit 503.

The thinning processing is processing for lowering the resolution of a processed image. The digital image signal output to the third image processing circuit 503 is a signal of an electronic subject image that can be displayed on the liquid crystal display device 108.

The CPU 500 can instruct a degree of the thinning processing performed on the digital image signal output to the second image processing circuit 506 according to a resolution having been set by a user. The CPU 500 can further instruct the degree of the thinning processing performed on the digital image signal output to the third image processing circuit 503 according to an appropriate resolution for the image display.

The thinning/extraction processing circuit 502 can further extract part of the above-described digital image signal and output the extracted signal to the white balance processing circuit (hereinafter, referred to "WB processing circuit") 505. The CPU 141 can instruct a method for extracting the digital image signal.

The WB processing circuit 505 is a circuit that can output white balance information (i.e., WB information) to adjust a color balance (i.e., a white balance) of an image. The WB processing circuit 505 can send the WB information directly to the third image processing circuit 503 and via the CPU 141 to the second image processing circuit 506.

The third image processing circuit 503 is a circuit that can generate image to be displayed on the liquid crystal display device 108. The third image processing circuit 503 can serve as a simple post-processing circuit configured to perform predetermined processing on the above-described digital image signal. The processing performed by the third image processing circuit 503 includes γ correction, reduction in data bit number, color adjustment based on the WB information, and conversion from a RGB signal into a YCbCr signal.

The third image processing circuit 503 can further perform distortion processing as described below. In general, software processing may not be speedy enough to repetitively display captured images on the liquid crystal display device 108. Therefore, the third image processing circuit 503 uses a hardware configuration for processing images to be displayed.

The video decoder 504 can form an electronic subject image by converting the YCbCr signal (i.e., the above-described digital image signal) into an NTSC signal, and causes the liquid crystal display device 108 to display the electronic subject image on the LCD 108*a*. The backlight 108*b* illuminates the display surface of the LCD 108*a* from the rear side with a quantity of light determined by the CPU 141.

The second image processing circuit 506 is a circuit that can generate the above-described digital image signal for storing in the flash memory 150. The second image processing circuit 506 serves as a post-processing circuit configured to perform predetermined processing. The processing performed by the second image processing circuit 506 includes γ correction, reduction in data bit number of the above-described digital image signal, color adjustment based on the WB information, conversion from a RGB signal into a YCbCr signal, defect pixel correction for the image sensor 127, smear correction, and hue/chromaticity processing.

The JPEG compression/expansion processing circuit 507 can perform JPEG compression processing on the digital image signal processed by the second image processing circuit 506 before the digital image signal is stored in the flash memory 150. The JPEG compression/expansion processing circuit 507 can read a JPEG image from the flash memory 150 and expand the read JPEG image.

Figure 4:
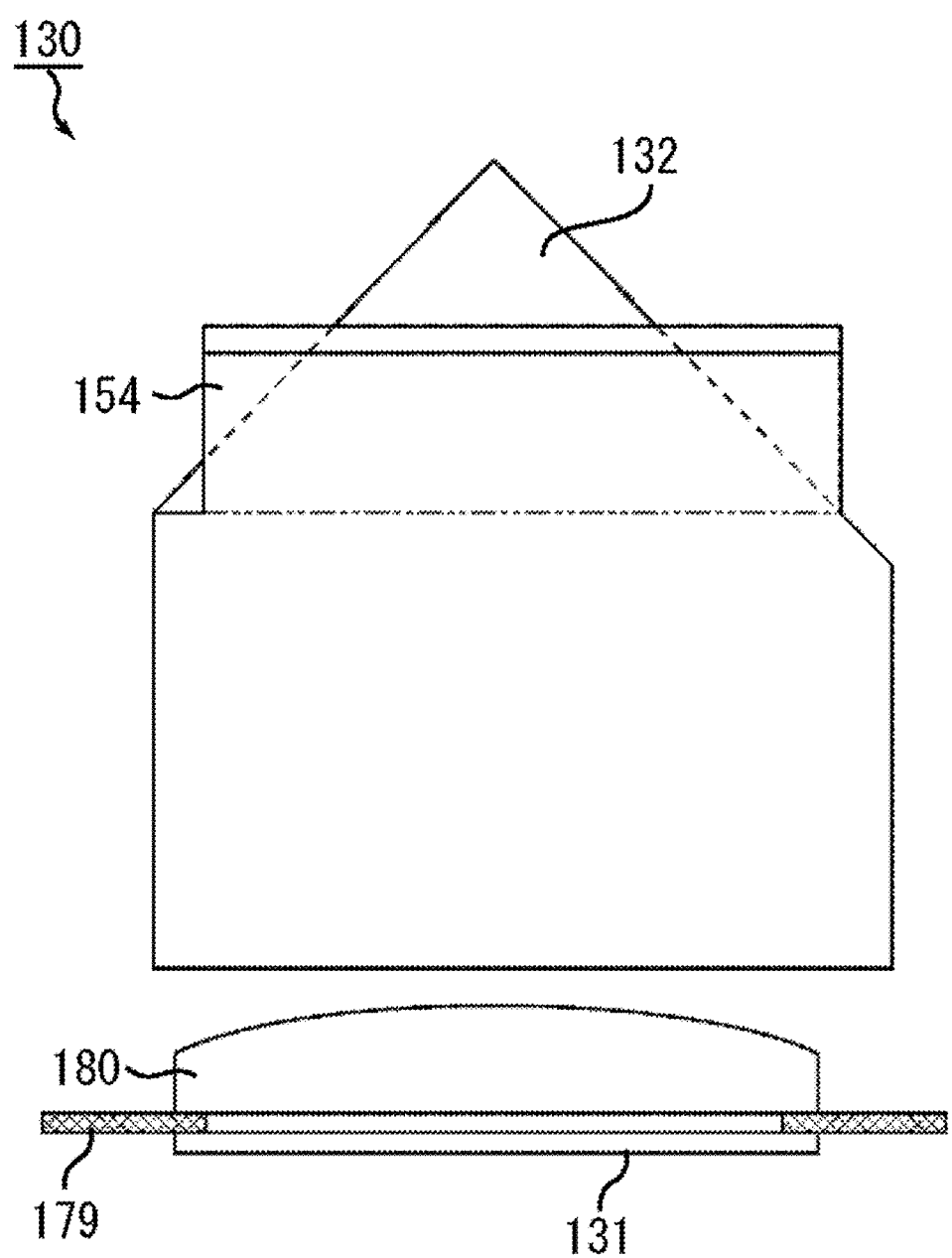
FIG. 4 is a side view illustrating a configuration of the finder apparatus as seen from a direction indicated by an arrow A in FIG. 3.

FIG. 3 is a cross-sectional view illustrating a configuration of the finder apparatus 130. FIG. 4 is a side view illustrating the configuration of the finder apparatus 130 as seen from a direction indicated by an arrow A in FIG. 3.

The focusing screen 131, a condenser lens 180, and the pentagonal prism 132 are provided on the optical path reflected and branched by the movable mirror 124 illustrated in FIG. 1.

The object light, i.e., the light image-formed on the focusing screen 131 via the lens groups (i.e., the lens groups 121, 167, and 123) of the photographic lens 120, then passes through the condenser lens 180 and the pentagonal prism 132 and exits from a surface 132b. The light further travels toward the eyepiece window 168 that is surrounded by an eye-cup 186.

In this case, the object light passes through a dichroic mirror 182 and reaches, via the eyepiece lens 133 (i.e., three lenses 133a, 133b, and 133c), an observer's eye surrounded by the eye-cup 186 in a state where the observer views the object via the eyepiece window 168. The object light re-forms an image on a retina of the observer's eye.

A mirror 184 reflects light emitted from an organic EL display element 185. The reflected light passes through a dioper adjustment lens 183 and is reflected by the dichroic mirror 182 toward the eyepiece window 168. A field mask 179 has a rectangular aperture that indicates a range of a subject image that can be captured by the image sensor 127.

Distance measuring position information 197 (see FIG. 7) of the focus detection apparatus 139 is indicated on the organic EL display element 185. When an observer views the finder, the observer can recognize the distance measuring position information 197 that is superposed on the object image in the field mask 179.

Figure 5:
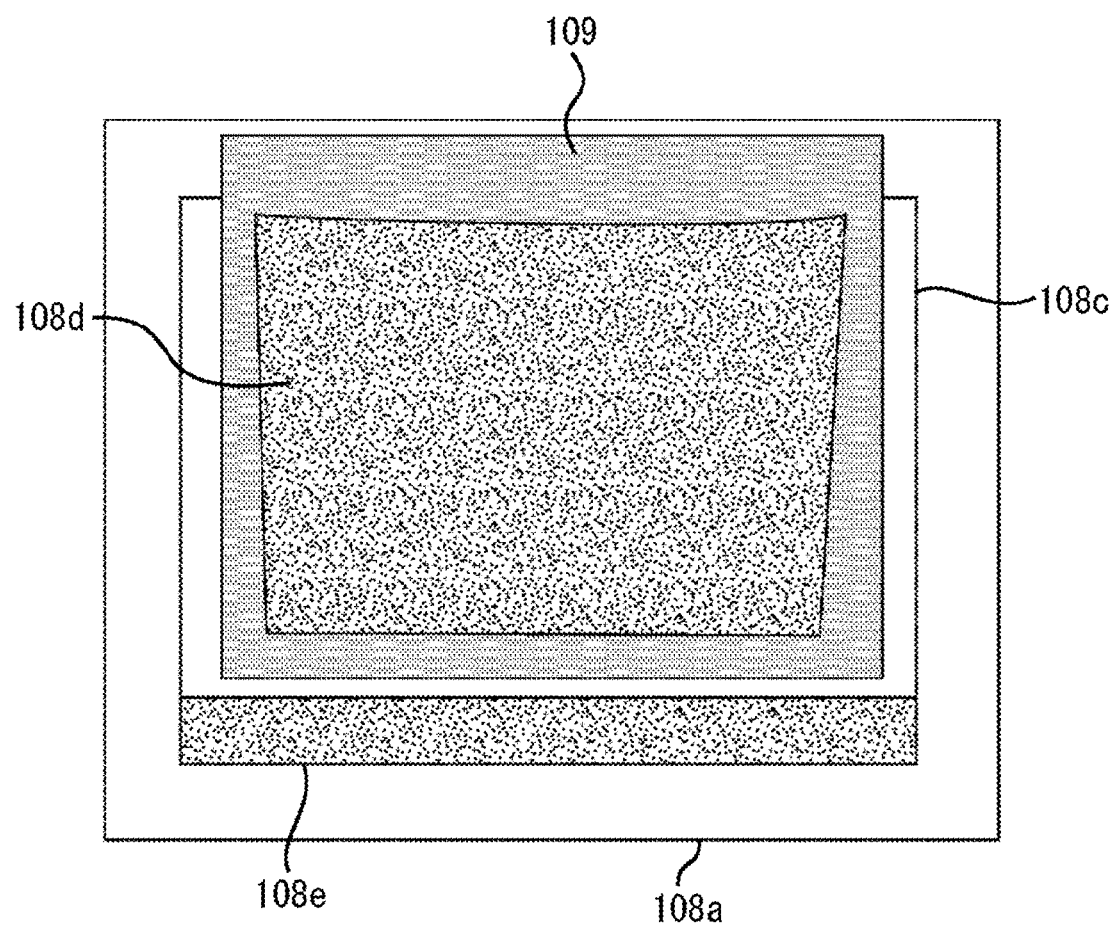
FIG. 5 illustrates a screen of a liquid crystal display (i.e., LCD) device.

FIG. 5 illustrates the liquid crystal display device 108 and a light-shielding member 109 disposed in front of the liquid crystal display device 108, as seen from the light incoming surface side.

The LCD 108a of the liquid crystal display device 108 includes a color display portion 108c that has an aspect ratio of 4:3. The display portion 108c can provide an LCD display area 108d and an LCD display area 108e, which can be used for electronic image display in a finder field. The LCD display area 108d has an aspect ratio of 3:2, which is similar to that of the image sensor 127. The LCD display area 108e has a flat shape extending in the horizontal direction.

The display area 108d may be seen as a barrel shape due to a distortion, when it is observed via the eyepiece lens 133. Hence, the camera according to the present exemplary embodiment uses the light-shielding member 109, which has an aperture portion distorted in a pincushion shape, to cover the display area 108d.

In other words, the light-shielding member 109 has an aperture shape distorted in an opposite direction to cancel the distortion generated when the light passes through the eyepiece lens 133. Thus, the light-shielding member 109 can appropriately mask the display area 108d to prevent the display area 108d from being distorted in a barrel shape.

A light beam 193 from the LCD display area 108d of the LCD 108a enters the pentagonal prism 132 from the surface 132b of the pentagonal prism 132. The light beam 193 becomes a light beam 192 in the pentagonal prism 132. The light beam 192 refracts and changes its traveling direction. The light beam 192 is next incident on a surface 132a (i.e., a surface on which silver vaporization is applied).

The light beam 192 reflects on the surface 132a and enters the prism 154. The prism 154 is bonded to the pentagonal prism 132. The light beam 192 further reflects on the surface 154a (i.e., a surface to which the silver vaporization is applied). Then, the light beam 192 reflects on the surface 154b (i.e., a surface to which silver vaporization is applied). The surface 154b of the prism 154 is continuously extending from the surface 132a of the pentagonal prism 132. Then, the light beam 192 exits from the surface 132b of the pentagonal prism 132 and travels toward the eyepiece window 168.

As described above, a reflection optical path can be configured in the prism 154. An optical path length from the eyepiece lens 133 to the LCD display area 108d becomes substantially equal to an optical path length from the eyepiece lens 133 to the focusing screen 131. The diopter of the LCD display area 108d substantially accords with the diopter of the focusing screen 131.

It is useful that the surface 154a of the prism 154 has an adequate curvature to accurately equalize the diopter of the LCD display area 108d with the diopter of the focusing screen 131.

In this case, even when the surface 154a is a flat surface, the diopter of the LCD display area 108d is not so different from the diopter of the focusing screen 131. Therefore, the curvature of the surface 154a may be a weak value. Although the reflection optical path of the surface 154a constitutes a decentered system, deterioration in optical aberrations can be ignored.

Figure 6A:
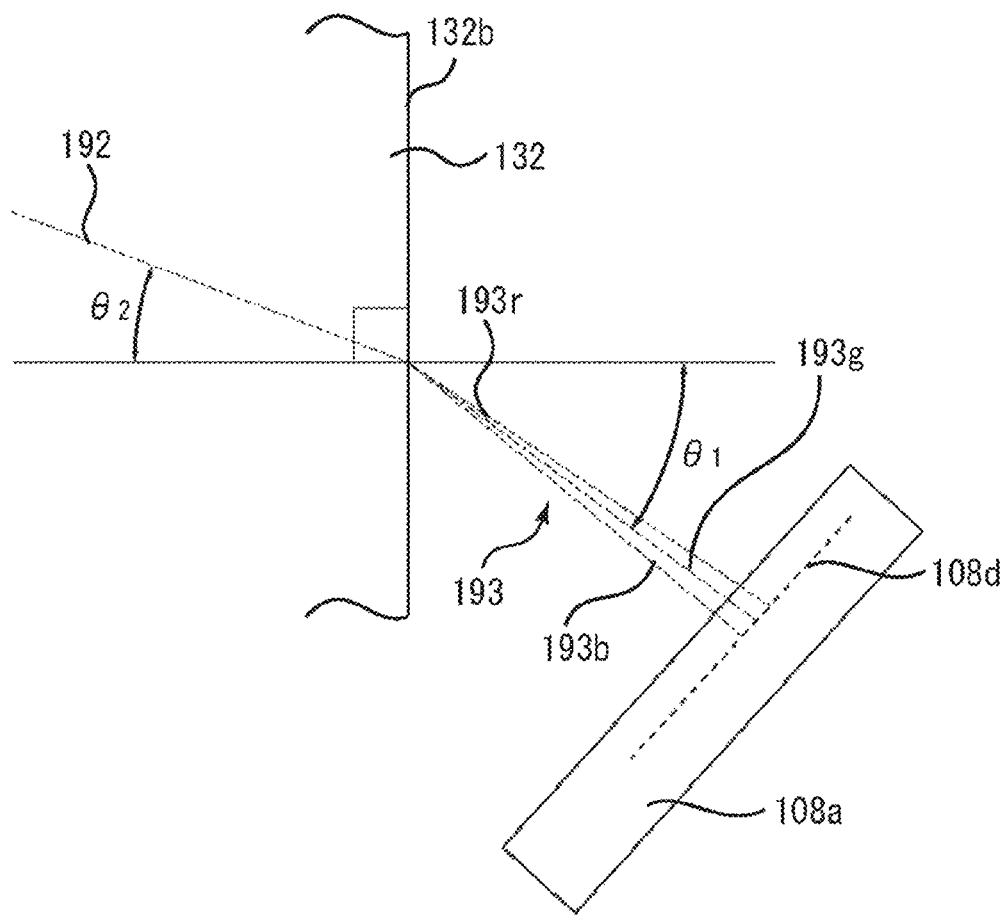
FIG. 6A illustrates an incidence state of a light beam that enters a pentagonal prism.

FIG. 6A illustrates an incidence state of the light beam that enters the pentagonal prism 132.

A green light beam 193g (i.e., part of the light beam 193) from the LCD display area 108d of the LCD 108a is obliquely incident on the surface 132b of the pentagonal prism 132 at an angle $\theta 1$. The green light beam 193g refracts on the air-glass interface and travels in the pentagonal prism 132 at an angle $\theta 2$.

In general, the relationship between the angle $\theta 1$ and the angle $\theta 2$ is variable depending on the wavelength of light due to the chromatic dispersion caused by the refractive index of the glass. If it is used for the electronic image display, undesirable vertical color bleeding is generated in the LCD display area 108d. Therefore, an obtained image has a deteriorated resolution. The present exemplary embodiment eliminates this drawback by shifting the electronic images (i.e., RGB images) to be displayed on the LCD display area 108d beforehand according to the positional deviation generated by the chromatic dispersion.

Figure 6B:
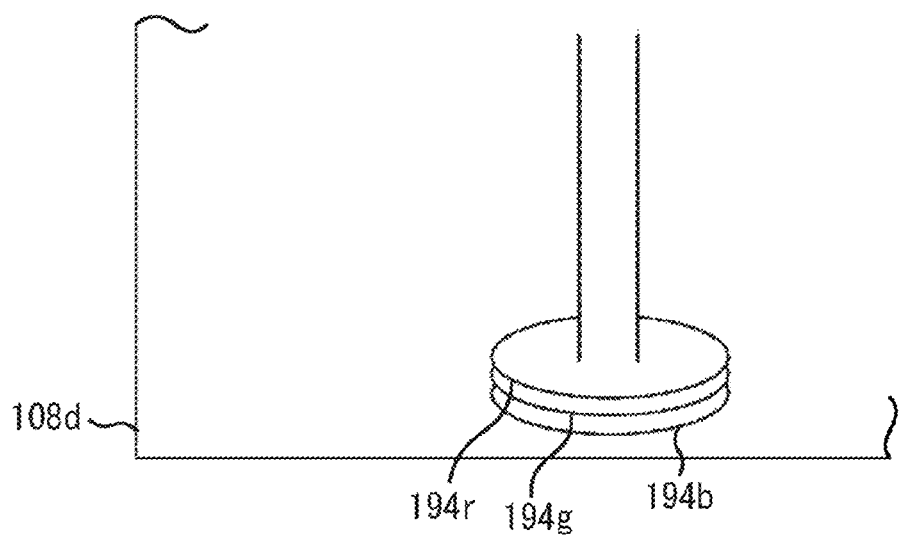
FIG. 6B illustrates a positional deviation of an electronic image that may be displayed on an LCD display area.

FIG. 6B illustrates a positional deviation of an electronic image displayed on the LCD display area 108d.

In the LCD display area 108d, a red electronic image 194r, a green electronic image 194g, and a blue electronic image 194b are mutually offset in the vertical direction.

As a result, the light beams 193r, 193g, and 193b emitted from the positions corresponding to the red electronic image 194r, the green electronic image 194g, and the blue electronic image 194b are integrated as a single light beam (i.e., the light beam 192) and can travel in the pentagonal prism 132 as illustrated in FIG. 6A. Then, the light beam 192 can reach the observer's eye in a state where the color bleeding is substantially eliminated.

A light beam 194 from the display area 108e of the LCD 108a passes through a light-guide prism 181 and enters the pentagonal prism 132 from a bottom surface of the pentagonal prism 132. Then, similar to the object light, the light beam 194 reflects in the pentagonal prism 132 and exits from the surface 132b.

Figure 7:
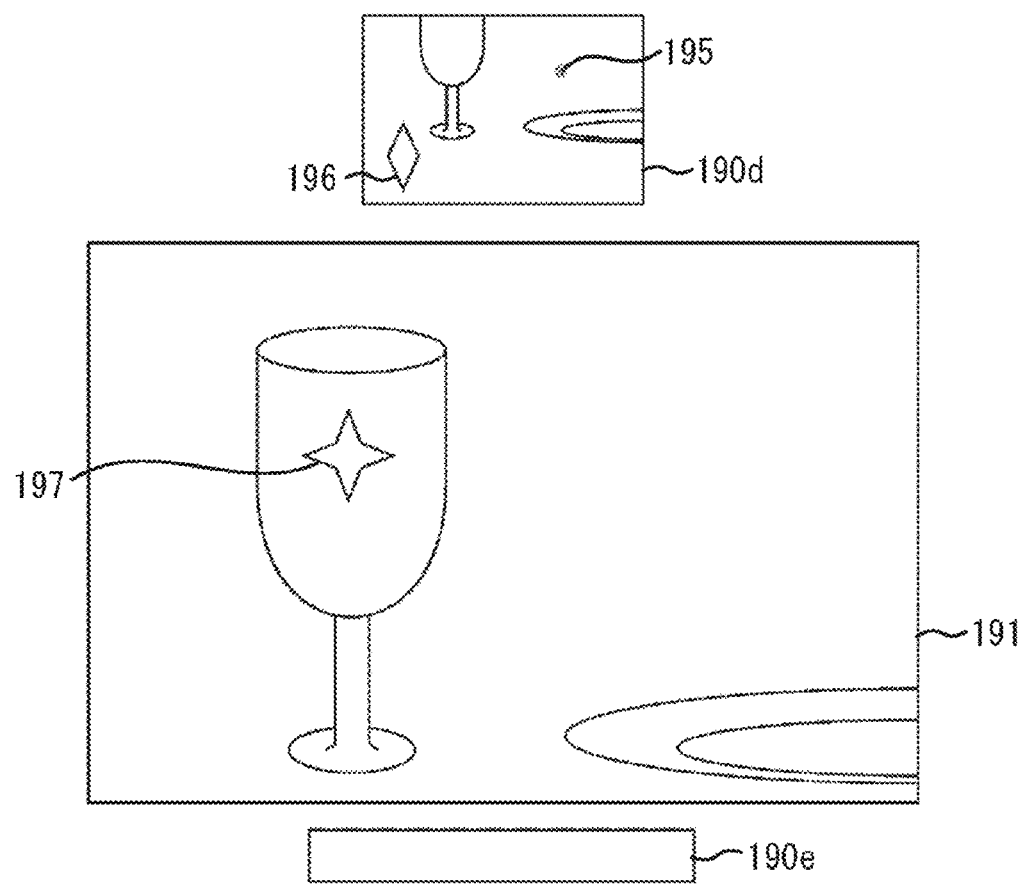
FIG. 7 illustrates images displayed in a finder field.

FIG. 7 illustrates images displayed in the finder field. The finder field includes a first display area 191, a second display area 190d, a third display area 190e, and the distance measuring position information 197. An optical image of the object regulated by the aperture of the field mask 179 is displayed in the first display area 191.

The second display area 190*d* is positioned above the first display area 191 and can be used to perform an information display using images based on the LCD display area 108*d* of the LCD 108*a*. The third display area 190*e* is positioned below the first display area 191 and can be used to perform an information display using character strings and icons based on the LCD display area 108*e* of the LCD 108*a*.

The distance measuring position information 197 is located in the first display area 191 and can be displayed by the organic EL display element 185. In this case, the luminance of each display area (i.e., the second display area 190*d*, the third display area 190*e*, and the distance measuring position information 197) can be appropriately controlled to a visually recognizable value based on an output of a light metering apparatus that includes the light metering sensor 156 and the light metering lens 155.

In the present exemplary embodiment, the second display area 190*d* is disposed above the first display area 191 and the third display area 190*e* is disposed below the first display area 191.

However, the second display area 190*d* can be disposed at an appropriate position other than the position illustrated in FIG. 7 and similar effect can be obtained as far as the second display area 190*d* and the first display area 191 are separated from each other.

For example, an electronic image that may be displayed in the second display area 190*d* of FIG. 7 is an image that was captured previously as one of information displays. It is understood that the electronic image illustrated in FIG. 7 includes a black point 195 because of a foreign particle adhered on the optical low-pass filter.

Users can confirm a state where a subject image is not an intended image that lacks the upper part of a subject due to an operation of the image stabilization mechanism 171, a state where an appropriate white balance is set, a state where an image is not blurred, and a state where a subject is in focus, by viewing an electronic image displayed in the second display area 190*d*.

Moreover, the present exemplary embodiment can simultaneously display a predetermined mark corresponding to the attribute of an image together with the image, to express information added to the image. For example, a rhombic-shaped mark 196 illustrated in FIG. 7 indicates that alteration detection data is appropriately added to the previously captured image by the image alteration detection data processing circuit 166.

If an image captured by another camera is displayed, another mark can be used to indicate an alteration detection determination result. Instead of using the liquid crystal display device 108, an organic electroluminescence display (i.e., organic EL display) may be used in the present exemplary embodiment. In this case, the backlight 108*b* is unnecessary.

Accordingly, when users confirm the state of an image captured by an imaging apparatus, it is unnecessary to move their eyes away from the finder while viewing an optical image. Moreover, an optical image observed in the first display area 191 does not overlap with an electronic image observed in the second display area 190*d*. Therefore, the present exemplary embodiment can provide a finder optical system that enables users to adequately view both an optical image and an electronic image simultaneously.

Figure 8:
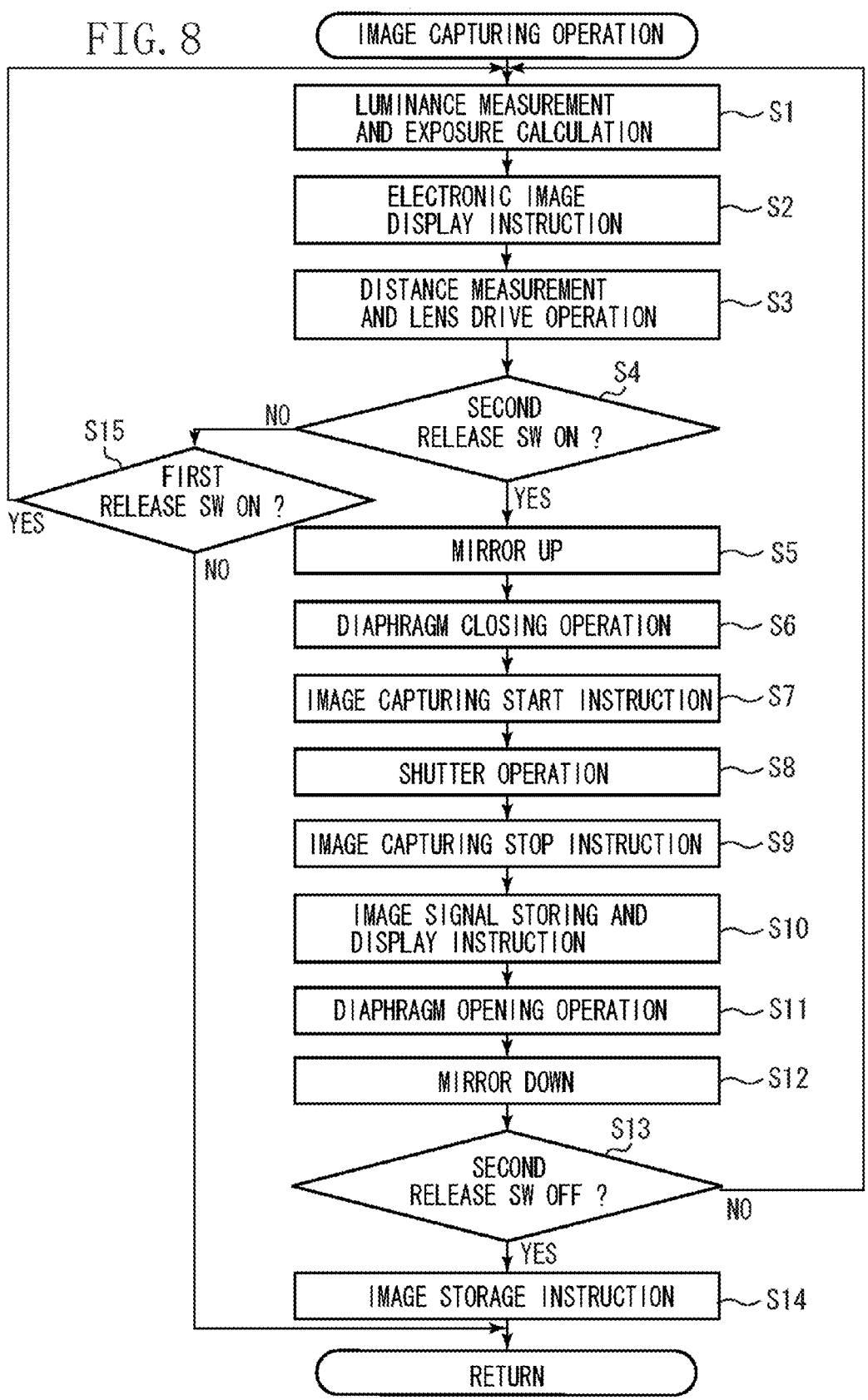
FIG. 8 is a flowchart illustrating a procedure of an image capturing operation that can be performed by the digital single lens reflex camera when a release button of a switch input unit is half pressed.

In the digital single lens reflex camera including the above-described configuration, the CPU 141 performs an operation according to the following sequence. FIG. 8 is a flowchart illustrating a procedure of an image capturing operation that can be performed by the digital single lens reflex camera in response to a release button half-press operation (i.e., a first release on operation) of the switch input unit 142.

The flowchart illustrated in FIG. 8 is a sub routine that may be called by the CPU 141 in the main flowchart. The main flowchart to be executed by the CPU 141 is conventionally known and therefore its description is omitted.

In step S1, the CPU 141 drives the light metering sensor 156 to perform light measurement using the light received via the light metering lens 155, and measures the luminance of a subject based on an output of the light metering sensor 156. The CPU 141 calculates a quantity of exposure light (e.g., a diaphragm closing amount of the diaphragm mechanism 122, a shutter speed of the shutter 126, and image sensor sensitivity) based on the luminance information according to a predetermined calculation program.

In step S2, the CPU 141 reads previously written image data (i.e., a digital image signal) from the flash memory 150 and sends a control signal to the signal processing circuit 145. In response to the control signal sent from the CPU 141, the finder apparatus 130 displays an electronic image of the object in the second display area 190*d*.

When the signal processing circuit 145 receives the control signal from the CPU 141, the signal processing circuit 145 performs processing for temporarily storing the above-described digital image signal in the SDRAM 148 and converting the image data into a composite signal.

The signal processing circuit 145 supplies the composite signal to the liquid crystal display device 108. The liquid crystal display device 108 displays the captured electronic image on the LCD 108*a*. As a result, the previously captured electronic image can be displayed in the second display area 190*d* of the finder apparatus 130. If the electronic image is already displayed, the signal processing circuit 145 continues the display.

The CPU 141 adjusts the light quantity of the backlight 108*b* by changing an amount of current to be supplied to the white LED that constitutes the backlight 108*b*. The CPU 141 illuminates the electronic subject image displayed on the LCD 108*a* with an appropriate quantity of light for visual recognition based on the subject luminance (i.e., luminance information) measured beforehand.

In step S3, the CPU 141 causes the AF sensor drive circuit 137 to drive the AF sensor 129, and measures a defocus amount (i.e., a distance measurement value) of the photographic lens 120. The CPU 141 further performs a focusing operation for the lens groups (i.e., lens groups 121, 167, and 123) based on the distance measurement value.

In step S4, the CPU 141 determines whether the release button is fully depressed by an operator of the camera. Namely, the CPU 141 determines whether the second release switch connected to the switch input unit 142 is turned on.

If it is determined that the second release switch is not turned on (NO in step S4), then in step S15, the CPU 141 determines whether the release button is half pressed by the operator of the camera. Namely, the CPU 141 determines whether the first release switch is turned on. If it is determined that the first release switch is turned on (YES in step S15), the CPU 141 determines that the release button is in a half pressed state. The processing returns to step S1.

If it is determined that the first release switch is not turned on (NO in step S15), the CPU 141 determines that the operator of the camera has moved a finger away from the release button. Therefore, the CPU 141 terminates the processing of the sub routine illustrated in FIG. 8 and resumes the processing of the main routine in the main flowchart.

If it is determined that the second release switch is in a turned-on state (YES in step S4), the CPU 141 determines that the release button is in a fully depressed state. Then, in step S5, the CPU 141 causes the mirror drive circuit 136 to move the movable mirror 124 from the first position to the second position. In other words, the CPU 141 controls the movable mirror 124 to retreat from the imaging optical path.

If the mirror-up operation in step S5 is completed, then in step S6, the CPU 141 causes the diaphragm drive circuit 135 to perform a diaphragm closing operation of the diaphragm mechanism 122 based on the diaphragm closing amount calculated in step S1.

In step S7, the CPU 141 sends a signal that instructs execution of an image capturing operation to the signal processing circuit 145. In response to this signal, the signal processing circuit 145 causes the image sensor 127 to start an electric charge storing operation. In step S8, the CPU 141 performs an opening/closing operation of the shutter 126 based on the shutter speed calculated in step S1.

In step S9, after completing a closing operation of the shutter 126, the CPU 141 sends a signal that instructs stoppage of the image capturing operation to the signal processing circuit 145. In response to this signal, the signal processing circuit 145 causes the image sensor 127 to terminate the electric charge storing operation.

The signal processing circuit 145 further performs analog-digital (A/D) conversion for converting an analog image signal read from the image sensor 127 into a digital image signal, and executes associated image processing.

In step S10, the CPU 141 sends a control signal that instructs storage and display of the above-described digital image signal to the signal processing circuit 145. In response to the control signal, the signal processing circuit 145 temporarily stores the above-described digital image signal in a continuous shooting data storage area of the SDRAM 148 in a predetermined order and performs processing for converting the data into a composite signal.

The signal processing circuit 145 supplies the composite signal to the liquid crystal display device 108. The liquid crystal display device 108 displays a captured electronic image on the LCD 108*a*. As a result, the electronic image can be displayed in the second display area 190*d* of the finder apparatus 130.

In this case, the CPU 141 adjusts the light quantity of the backlight 108*b* by changing the amount of current to be supplied to the white LED that constitutes the backlight 108*b*. Then, the CPU 141 illuminates the electronic subject image displayed on the LCD 108*a* with an appropriate quantity of light for visual recognition based on the subject luminance measured beforehand.

In step S11, the CPU 141 causes the diaphragm drive circuit 135 to return the diaphragm mechanism 122 from a diaphragm closed state to a diaphragm opened state. In step S12, the CPU 141 causes the mirror drive circuit 136 to return the movable mirror 124 to the imaging optical path (i.e., the first position). Namely, the CPU 141 performs a mirror-down operation.

In step S13, the CPU 141 determines whether the second release switch is turned off. If it is determined that the second release switch is not in an OFF state (NO instep S13), the processing returns to step S1 and the CPU 141 repeats the processing of steps S1 to S12 until the second release switch is turned off.

In other words, the camera does not stop a continuous shooting operation unless the second release switch is turned off. The finder apparatus 130 sequentially displays captured electronic subject images like a moving image.

If it is determined that the second release switch is in a turned-off state (YES in step S13), the CPU 141 determines that the operator of the camera stops the continuous shooting operation. In this case, in step S14, the CPU 141 instructs the signal processing circuit 145 to transfer the continuous shooting images temporarily stored in the SDRAM 148 to a predetermined storage area of the flash memory 150. Then, the CPU 141 resumes the processing of the main routine.

Figure 9:
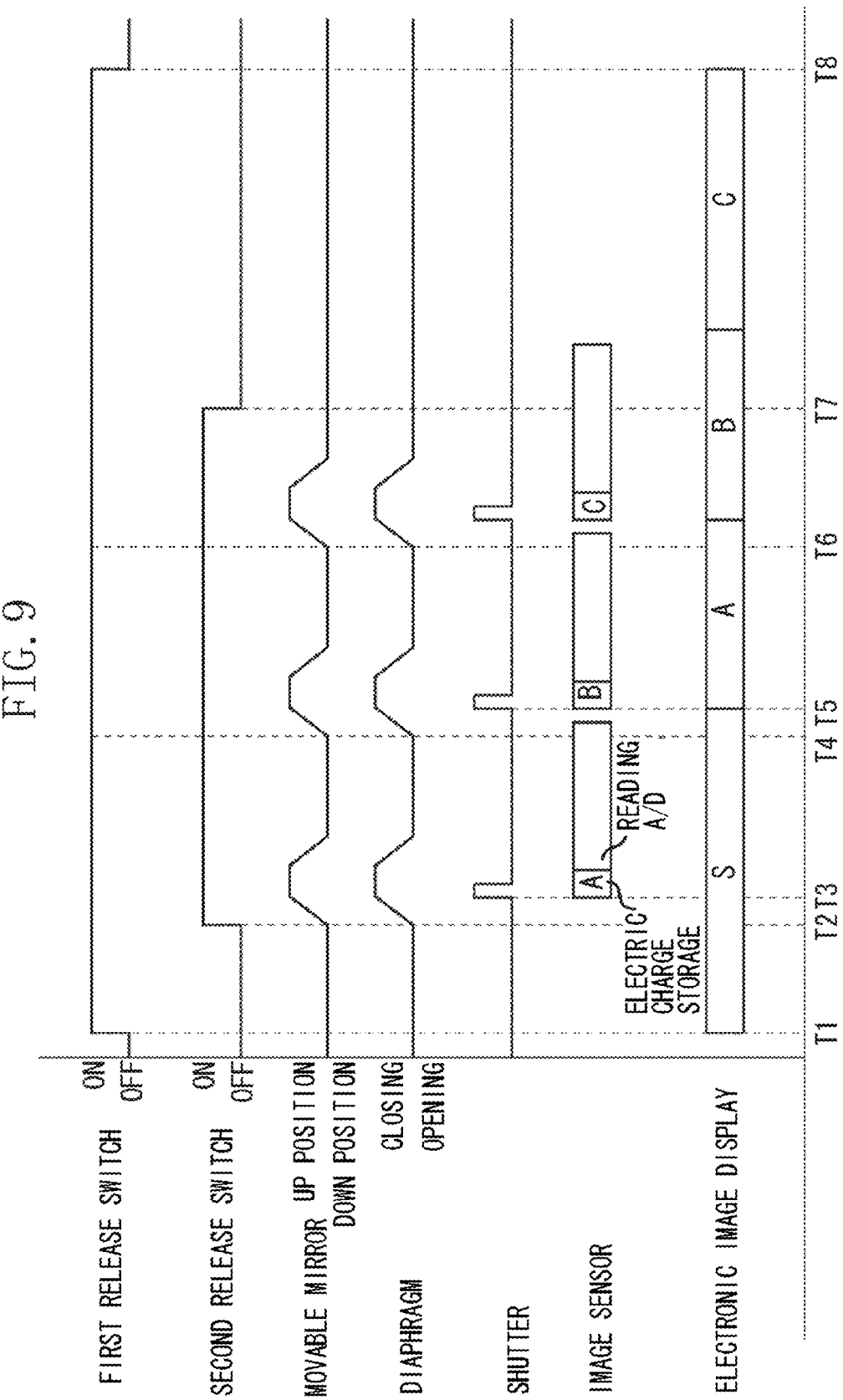
FIG. 9 is a timing diagram illustrating a camera operation based on an operation sequence of the CPU.

FIG. 9 is a timing diagram illustrating a camera operation based on the operation sequence of the CPU 141. According to the shooting operation illustrated FIG. 9, the release button is half pressed shortly and then fully pressed to capture three frames of images. Then, the release button is held in the half pressed state for a while.

First, at time T1, the first release switch changes from an OFF state to an ON state. The CPU 141 immediately starts the light metering operation and the exposure quantity calculation. Then, the CPU 141 displays a previously captured image S in the second display area 190*d* of the finder apparatus 130.

At time T2, the second release switch changes from an OFF state to an ON state. The movable mirror 124 moves to the up position. The diaphragm 122 of the photographic lens 120 starts closing its aperture.

At time T3, the image sensor 127 starts an electric charge storing operation for an image A. Meanwhile, the shutter 126 performs an opening/closing operation. When the shutter 126 is closed, the image sensor 127 stops the electric charge storing operation and starts reading an image signal of the image A. The read image signal is then subjected to the A/D conversion. The diaphragm 122 performs an opening operation, while the movable mirror 124 moves to the down position.

After the image signal of the image A is thoroughly read out and the A/D conversion is completed, the digital image signal is temporarily stored in the continuous shooting data storage area of the SDRAM 148 according to a predetermined order. The image data is converted into a composite signal.

The converted composite signal is supplied to the liquid crystal display device 108. The LCD 108*a* displays the captured image A. As a result, the captured image A can be visually recognized in the second display area 190*d* of the finder apparatus 130. The image S is continuously displayed in the second display area 190*d* of the finder apparatus 130 from time T1 until an instruction for updating the electronic image display to the image A is issued.

At time T4, the release button is held at the fully pressed state and the second release switch is in a turned-on state. The movable mirror 124 again moves to the up position, while the diaphragm 122 of the photographic lens 120 starts closing its aperture.

At time T5, the image sensor 127 starts an electric charge storing operation for an image B. Meanwhile, the shutter 126 performs an opening/closing operation.

When the shutter 126 is closed, the image sensor 127 stops the electric charge storing operation and starts reading an image signal of the image B. The read image signal is then subjected to the A/D conversion. The diaphragm 122 performs an opening operation, while the movable mirror 124 moves to the down position.

After the image signal of the image B is thoroughly read out and the A/D conversion is completed, the digital image signal is temporarily stored in the continuous shooting data storage area of the SDRAM 148 according to a predetermined order. The image data is converted into a composite signal. The converted composite signal is supplied to the liquid crystal display device 108. As a result, the LCD 108*a* displays the captured image B. The captured image B can be visually recognized in the second display area 190*d* of the finder apparatus 130.

The image A is continuously displayed in the second display area 190*d* of the finder apparatus 130 until an instruction for updating the electronic image display to the image B is issued.

At time T6, the release button is held at the fully pressed state and the second release switch is in a turned-on state. The movable mirror 124 again moves to the up position, while the diaphragm 122 of the photographic lens 120 starts closing its aperture. Then, an operation similar to the above-described operation (refer to the operations at times T4 and T5) is repeated to capture an image C.

The image B is continuously displayed in the second display area 190*d* of the finder apparatus 130 until an instruction for updating the electronic image display to the image C is issued.

At time T7, the release button is not fully pressed and the second release switch is turned off. The continuous shooting operation is stopped. Meanwhile, the image signal of the image C is read and subjected to the A/D conversion. The operation for updating the display of the image C is continuously performed.

At time T8, the release button is not half pressed and the first release switch is turned off. The electronic image display in the second display area 190*d* of the finder apparatus 130 is stopped.

In the above-described operation sequence, the sequential operation for reading an image signal, performing A/D conversion, storing image data in a memory (e.g., the SDRAM 148), opening the diaphragm 122, and returning the movable mirror 124 to the first position (i.e., the down position) is a shooting preparatory operation for the next frame. An operation for updating the electronic image to be displayed in the second display area 190*d* is performed in synchronization with the shooting preparatory operation.

Figure 10:
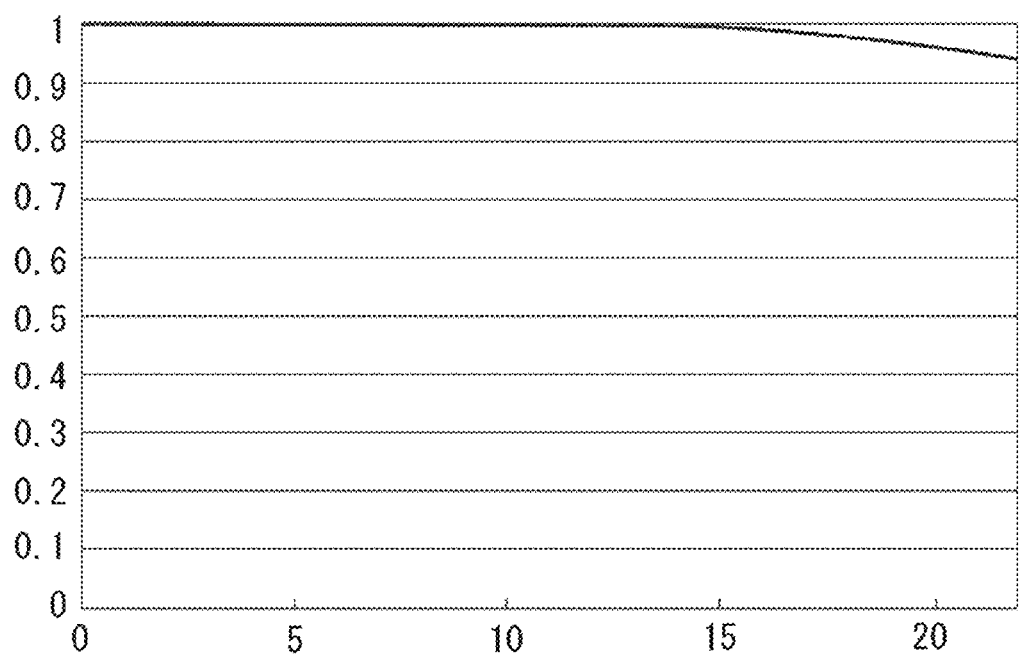
FIG. 10 illustrates a ratio of the distortion that may be generated by an eyepiece lens.

FIG. 10 is a graph illustrating a ratio of the distortion that may be generated in an output light flux when an input light flux passes through the eyepiece lens 133. In FIG. 10, an abscissa axis indicates an image height [mm] and an ordinate axis indicates the ratio of the distortion.

The ratio of the distortion represents the degree of a distortion of an image in each image height in a state where the origin is set on the optical axis. The ratio of the distortion is "1" in a state where there is no distortion. If the ratio of the distortion is smaller than "1", the image causes a distortion in a direction approaching to the optical axis. If the ratio of the distortion is greater than "1", the image causes a distortion in a direction departing from the optical axis.

The full range of the abscissa axis corresponds to an image height at a diagonal edge of the rectangular aperture of the field mask 179. According to the distortion illustrated in FIG. 10, the image height of the optical image at the diagonal edge is approximately 95%.

Figure 11A:
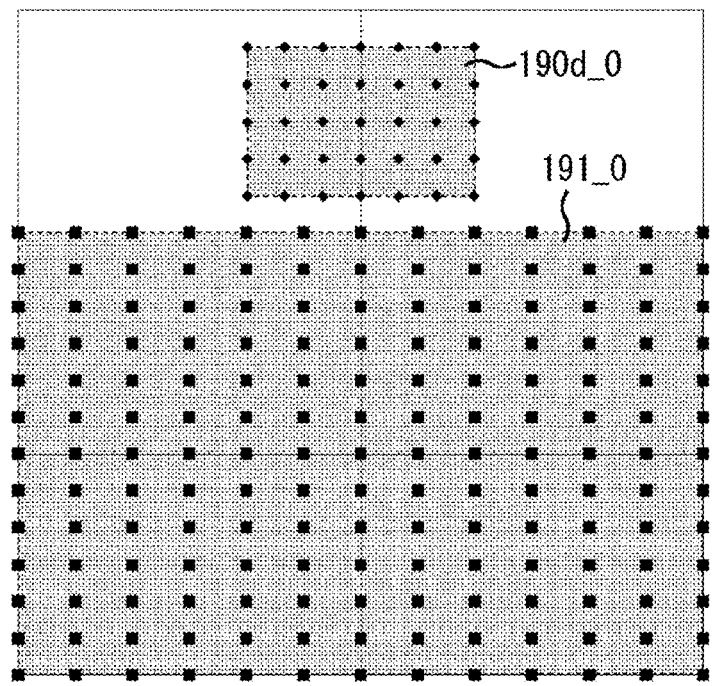
FIG. 11A illustrates the shape of an optical image and the shape of an electronic image in a case where no distortion is generated when the light passes through the eyepiece lens.

FIG. 11A illustrates the first display area 191 and the second display area 190*d* that can be observed in a case where no distortion is generated when the light passes through the eyepiece lens 133.

To simplify the explanation, it is now assumed that a rectangular optical image is fully displayed on the focusing screen 131 and a rectangular electric image is fully displayed in the LCD display area 108*d* of the liquid crystal display device 108.

The rectangular optical image on the focusing screen 131 becomes a rectangular optical image indicated by 191_0, when it is observed via the eyepiece lens 133. The rectangular electronic image on the LCD display area 108*d* of the liquid crystal display device 108 becomes a rectangular electronic image indicated by 190*d*_0, when it is observed via the eyepiece lens 133.

The illustration of the rectangular optical image 191_0 includes discrete points that are plotted at regular pitches in the vertical and horizontal directions so as to express the degree of the distortion in the entire area. Similarly, the illustration of the rectangular optical image 190*d*_0 includes discrete points that are plotted at regular pitches in the vertical and horizontal directions so as to express the degree of the distortion in the entire area.

The first display area 191 and the second display area 190*d* to be observed when the distortion illustrated in FIG. 10 is generated when the light passes through the eyepiece lens 133 are described below referring to FIG. 11B.

The rectangular optical image on the focusing screen 131, when it is observed through the eyepiece lens 133, can be recognized as a barrel-shaped optical image indicated by 191_1 due to the influence of the distortion. The rectangular electronic image in the LCD display area 108*d* of the liquid crystal display device 108, when it is observed through the eyepiece lens 133, can be recognized as a barrel-shaped electronic image having an asymmetric shape in the vertical direction, as indicated by 190*d*_1 due to the influence of the distortion.

Figure 11B:
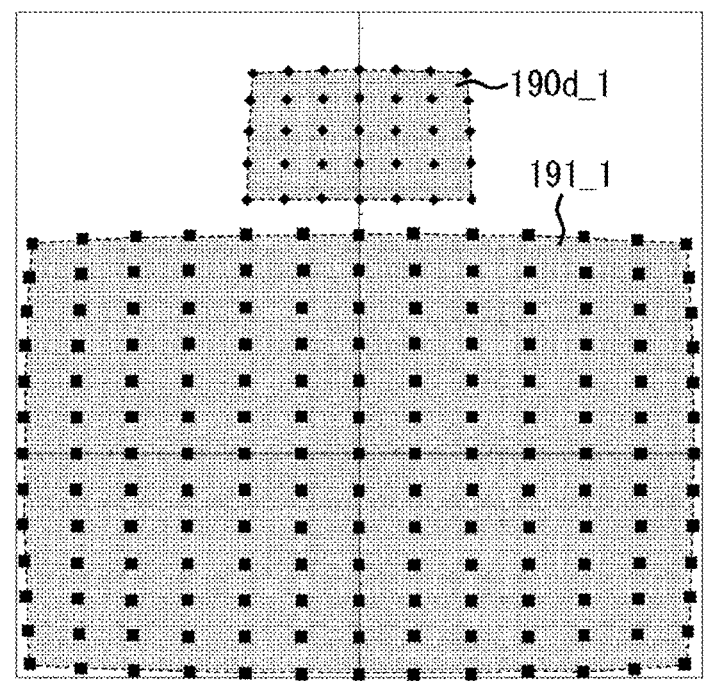
FIG. 11B illustrates the shape of an optical image and the shape of an electronic image in a case where the distortion illustrated in FIG. 10 is generated when the light passes through the eyepiece lens.

As understood from FIG. 11B, the barrel-shaped electronic image 190*d*_1 is located at a position where the image height is great. Therefore, compared to the optical image, the image 190*d*_1 tends to be greatly distorted. As the distortions generated at the upper and lower edges are asymmetric, the quality of a display image is dissatisfactory.

Figure 12:
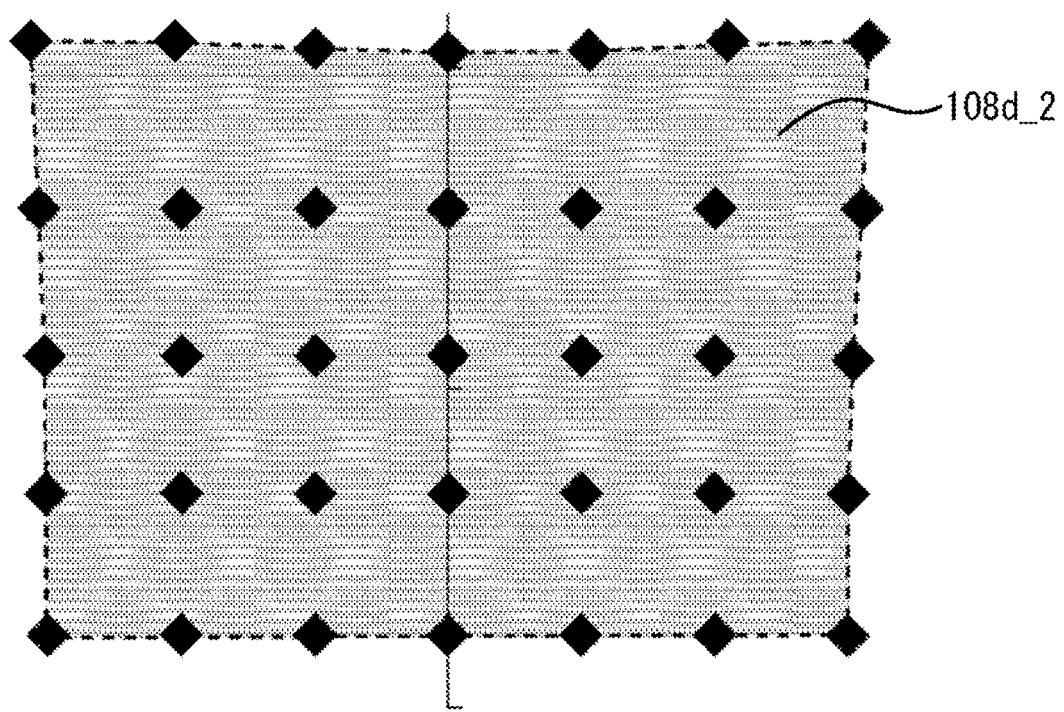
FIG. 12 illustrates an image to be displayed on the LCD display area of a liquid crystal display device, wherein the image is distorted in an opposite direction to cancel the distortion generated when the light passes through the eyepiece lens.

Hence, the camera according to the present exemplary embodiment displays an image having a pincushion-shaped distortion as illustrated in FIG. 12 as an image to be displayed in the LCD display area 108*d* of the liquid crystal display device 108.

An image 108*d*_2, i.e., an image to be displayed in the LCD display area 108*d*, has a shape distorted in an opposite direction to cancel the distortion caused when the light passes through the eyepiece lens 133. When the oppositely distorted image 108*d*_2 is observed via the eyepiece lens 133, the distortion can be eliminated and a rectangular image having no distortion can be seen. More specifically, the width of the distorted image 108*d*_2 becomes wider when the image height becomes greater.

To this end, the present exemplary embodiment performs image processing for greatly distorting the upper side of an electronic image. The distortion ratio in this case is a reciprocal of the distortion ratio of the eyepiece lens 133 illustrated in FIG. 10. The pincushion-shaped image 108*d*_2, when it is displayed in the second display area 190*d*, can be observed as an image having no distortion via the eyepiece lens 133.

More specifically, the third image processing circuit 503 performs image processing on an image to be displayed so that the displayed image can have the above-described pincushion-shaped distortion. The distorted signal through the above-described image processing is sent to the liquid crystal display device 108.

As described above with reference to FIGS. 10 to 12, the present exemplary embodiment can display the image 108*d*_2, which is distorted in the opposite direction to cancel the distortion generated when the light passes through the eyepiece lens 133, in the LCD display area 108*d* of the liquid crystal display device 108. The above-described configuration of the present exemplary embodiment can reduce the vertically asymmetric distortion that may be generated in the second display area 190*d*.

As understood from the foregoing description, the camera according to the present exemplary embodiment enables users to observe an optical image of a subject without moving their eyes away from the finder. The electronic image displayed by the camera according to the present exemplary embodiment enables users to confirm the state of a captured image, the setting state of the camera, and photographic auxiliary information.

Accordingly, the present exemplary embodiment can provide a camera that enables users to capture images without missing photo opportunities. More specifically, users can confirm the presence of a foreign particle adhered on the optical low-pass filter and can recognize a change in the composition that may be caused according to an activation of the image stabilization mechanism 171, while viewing an electronic image displayed together with an optical image in the finder. Furthermore, the present exemplary embodiment enables users to get information relating to white balance, image blur, and focus.

As a result, the present exemplary embodiment can prevent any failure in a shooting operation. When users confirm the state of a captured image, it is unnecessary to move their eyes away from the finder while viewing an optical image. Therefore, users do not miss photo opportunities.

Moreover, the present exemplary embodiment enables users to visually confirm both the optical image and the electronic image simultaneously because they are not overlapped with each other. The electronic image can be displayed in synchronization with the shooting preparatory operation for the next frame. The users can perform the above-described confirmations immediately after each shooting operation is finished.

The camera according to the present exemplary embodiment includes the liquid crystal display device 108 that can display an image distorted in the opposite direction to cancel the distortion that may be generated when the light passes through the eyepiece lens 133. Therefore, the present exemplary embodiment can reduce the distortion that may be generated in the second display area 109*d*.

Thus, the present exemplary embodiment can present the second display area 109*d* from distorting asymmetrically in the vertical direction. The present exemplary embodiment can improve the quality of an electronic image to be displayed in the second display area 109*d*.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-174558 filed Jul. 3, 2008, which is hereby incorporated by reference herein in its entirety.

What is claimed is:

1. An imaging apparatus comprising:
   an image sensor configured to capture an image of a subject;
   a finder optical system configured to enable a photographer to optically observe the subject, the finder optical system including a prism having a plurality of reflection surfaces; and
   an image display unit disposed in the finder optical system and configured to display the captured image and to enable the photographer to observe an electronic image of the subject through the prism when the photographer looks in the finder optical system,
   wherein an optical image of the subject and the electronic image of the subject are reflected by the different reflection surfaces of the prism included in the finder optical system, and
   wherein the image display unit is configured to display on a display area an image having been subjected to image processing performed on the electronic image considering a distortion caused by the finder optical system.

2. The imaging apparatus according to claim 1, wherein the image display unit is disposed in the finder optical system so as to prevent the captured image overlapping with an optical image of the subject, when the photographer looks in the finder optical system.

3. The imaging apparatus according to claim 2, wherein the image display unit is disposed in the finder optical system so that the captured image is positioned in a peripheral portion compared to the optical image of the subject, when the photographer looks in the finder optical system.

4. The imaging apparatus according to claim 3, wherein the image display unit is configured to display an image having been subjected to image processing that can cancel a distortion caused by an aberration of a peripheral portion of the finder optical system.

5. The imaging apparatus according to claim 1, wherein a ratio of a distortion caused when a light flux passes through the finder optical system is in a reciprocal relationship with a ratio of a distortion given to the captured image, which is displayed by the image display unit.

6. The imaging apparatus according to claim 1, wherein the image display unit is configured to display an image having been subjected to image processing for distorting an outer side edge of the captured image in a pincushion shape.

7. The imaging apparatus according to claim 1, further comprising a light-shielding member disposed on a display surface of the image display unit and having a shape corresponding to a shape of an image on which image processing determined in consideration of the distortion caused by the finder optical system is performed.

* * * * *